Sept. 22, 1970  C. J. QUEEN  3,529,402
SADDLETREE

Filed Nov. 8, 1968  2 Sheets-Sheet 1

INVENTOR
CARL J. QUEEN

BY *Jones & Thomas*
ATTORNEYS

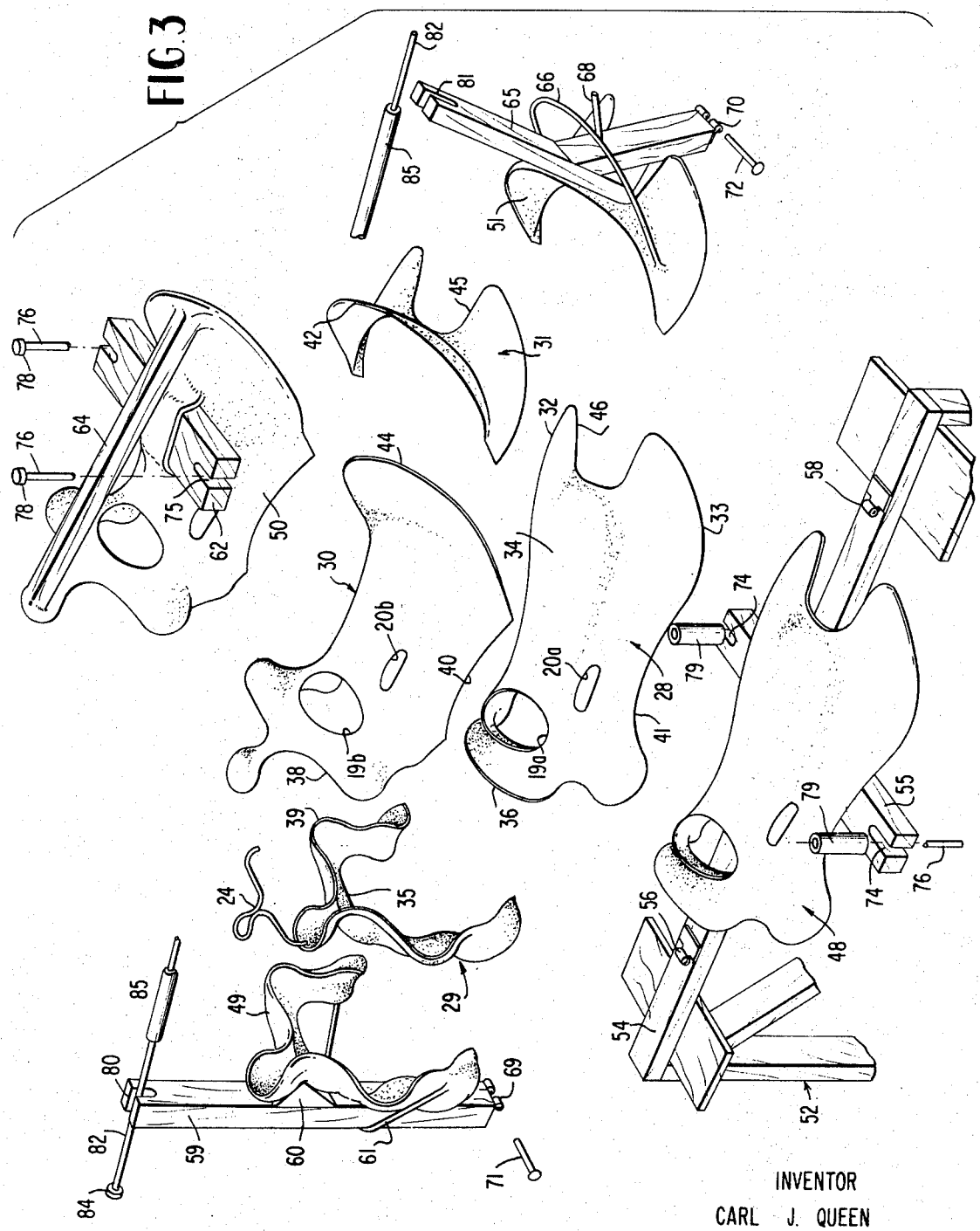

United States Patent Office 3,529,402
Patented Sept. 22, 1970

---

3,529,402
SADDLETREE
Carl J. Queen, 53 New Peachtree Road,
Chamblee, Ga. 30005
Filed Nov. 8, 1968, Ser. No. 774,263
Int. Cl. B68c 1/00
U.S. Cl. 54—44                5 Claims

ABSTRACT OF THE DISCLOSURE

A method and apparatus for molding saddletrees wherein sheets of fibrous glass are saturated with a mixture including polyester and a catalysis and applied to separated mold surfaces and cured. Additional layers of saturated mats are then applied to the edges of the cured mats and the mold sections are connected together and the additional saturated mats are cured, which connects the sections of the saddletree together. A sectional mold is utilized to both form the individual saddletree sections and to connect the sections to each other.

BACKGROUND OF THE INVENTION

Saddles produced for the purpose of riding horses historically have been constructed with a wooden "tree" which is covered with leather, and to which various attachments are connected. The saddletree is usually formed in sections which include: a pair of supporting rails, the front pommel structure, and the rear cantle structure. The rail sections are shaped to extend along and generally conform to the upper surface of the back of a horse, and the pommel and cantle sections extend transversely across the upper surfaces of the rail sections, at the front and rear of the rail sections. The upper surfaces of the rails and the cantle and pommel sections generally correspond to the shape of the buttocks and upper legs of a human to provide a seat surface. The various pieces of a saddletree are curved and define slopes and angles which conform and merge generally with adjacent pieces of the tree, and each piece is usually individually cut and carved and nailed, stapled, or screwed to its adjacent pieces.

The procedures for cutting the individual saddletree pieces are such that each piece is individually cut and thus shaped in an individual manner, so that no two corresponding pieces are identically sized or shaped. Furthermore, the process of assembling the pieces of a saddletree is also subject to human error, and the pieces are almost always poorly aligned or positioned together, and the nails or screws used to connect the pieces together are frequently improperly inserted, which may weaken or damage the saddletree.

After the wooden saddletree has been formed and assembled the saddle structure is completed by stretching leather over the saddletree and connecting the various attachments to the tree. Because of the unsymmetrical shape of the tree, strips of leather or other material are used to build up and reshape the tree to a more symmetrical shape. Furthermore, after the tree has been reshaped, the top center portion must be built up to form the seat surface. The seat surface is usually formed from a combination of materials, including sheet metal, leather and felt, and must be carefully formed to provide a smooth, eye appealing, comfortable surface. The leather to be stretched over the built up tree must be placed on a form, wetted, and pounded to assume the shape of the form. The leather is then transferred to the built up tree and seamed together about the tree.

In completing the assembly, it is frequently necessary to penetrate the leather by boring a hole through the leather and the saddletree or by driving nails or screws directly through the leather into the tree in order to connect the various attachments to the saddle. When the leather covering is penetrated in this manner, the inner saddletree is exposed, at least to some extent to the atmosphere and moisture and other contaminates will reach the wood of the saddletree. This creates a condition where the nail is likely to rust and the wood of the saddletree is likely to rot. Also, the hole in the leather of the saddletree tends to create a weak spot in the leather which may tear or split with aging. Furthermore, once a saddletree has become damp due to atmospheric conditions or due to sweat from the horse or its rider, the saddle tree does not dry easily since the leather protects it from the atmosphere. If a saddle having a damp tree is exposed to freezing temperature, the moisture in the saddletree may freeze and split the wood, and since the dampness of a saddletree usually occurs around a nail, the freezing and rotting of a saddle tree will usually be in the vicinity of a nail, which causes the nail to become loose.

SUMMARY OF THE INVENTION

Briefly described, the present invention comprises a method and apparatus for molding a saddletree of liquid impervious material, so that it is not subject to rotting or splitting. Each saddletree produced with the molding procedure is a uniform size and shape so that the leather to be applied to the saddletree can be cut from standard patterns to minimize leather waste and streamline the fabrication of a saddle. The tree is shaped so that it does not have to be built up and the leather can be applied to the tree and wetted and pounded as necessary to conform to the shape of the trees. Thus, it is an object of this invention to provide a method and apparatus for molding saddletrees so that the saddletrees are of uniform size and shape.

Another object of this invention is to provide a saddletree which will not rot or split and which is much stronger than a conventional wooden saddletree.

Another object of this invention is to provide a method of molding saddletrees which is inexpensive to perform, and which rapidly produces saddletrees of superior strength characteristics.

An other object of this invention is to provide a saddletree that does not have to be built up to form the seat surface of the tree.

Another object of this invention is to provide an inexpensive saddletree of unitary construction which is light in weight and which can be penetrated by nails without danger of splitting or rotting.

Another object of this invention is to provide apparatus for molding saddletrees which can be rapidly handled and manipulated in the molding process.

Other objects, features and advantages of the present invention will become apparent upon reading the following specification when taken in conjunction with the accompanying drawing.

BRIEF DESCRIPTION OF THE DRAWING

FIG. 3 is an exploded perspective view of the unassembled sections of the saddletree and the mold sections of the saddletree, and their related components.

DESCRIPTION OF THE PREFERRED EMBODIMENTS

Figure 1:
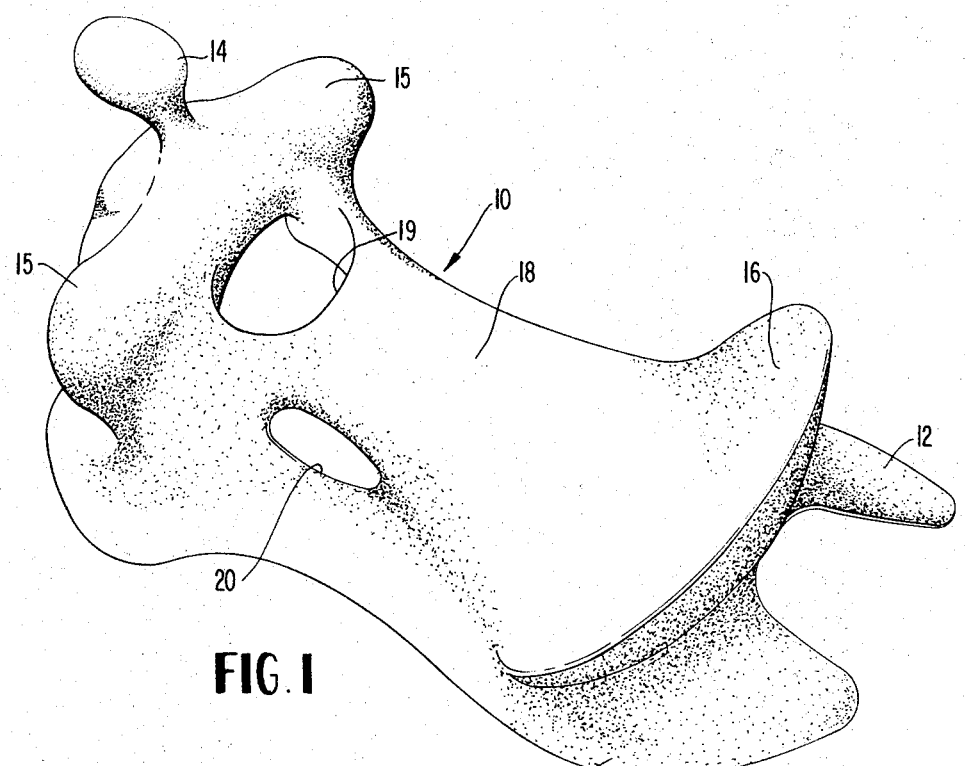
FIG. 1 is a perspective view of an assembled saddletree, showing the top, side and rear surface of the saddletree.

Referring now in more detail to the drawing wherein like numerals indicate like parts throughout the several views, FIG. 1 shows saddletree 10 which includes rails 11 and 12, pommel 14, pommel support shoulders 15, cantle 16, and seat area 18. Seat opening 9 is defined between the main seat area 18 and pommel support shoulders 15 and stirrup attachment openings 20 are defined between the main portion of seat area 18 and the rails 11 and 12.

Figure 2:
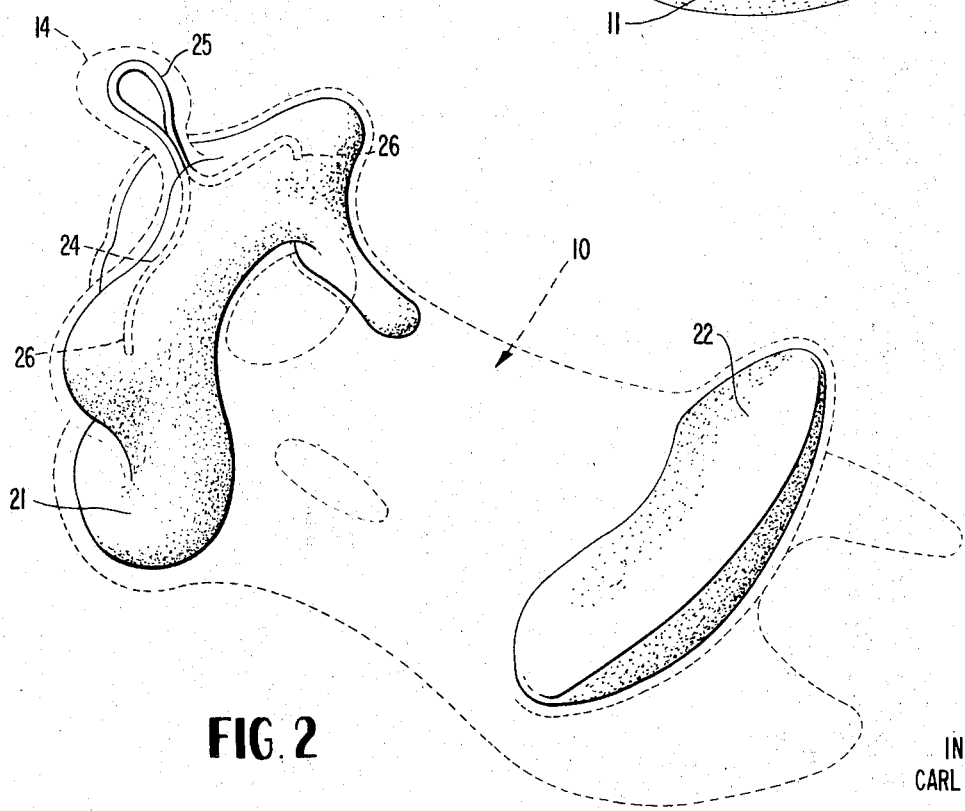
FIG. 2 is a perspective view of a saddletree, similar to FIG. 1, but showing the filler material of the saddletree in unbroken lines and the outer shell of the saddletree in dashed lines.

As is shown in FIG. 2, saddletree 10 is a hollow shell and defines hollow portions in the vicinity of pommel support shoulders 15, pommel 14, cantle 16, and the rear extremities and forward extremities of rails 11 and 12. Filler material 21 is placed in the forward portion of saddletree 10, while filler material 22 is placed in the rear portion of the tree. Filler material 21 in the forward portion of tree 10 extends up into the hollow portion of pommel 14, and metal pipe 24 is bent to form a loop 25 intermediate its ends, and loop 25 projects into the hollow portion of pommel 14 while the free ends 26 of pipe 14 extend into the pommel support shoulders 15. The filler material 21 surrounds pipe 24 and holds pipe 24 in positive position within saddletree 10.

As shown in FIG. 3, a saddletree is fabricated in sections, and the sections are fastened together to form an integral tree structure. The sections of the saddletree include: rails section 28, pommel section 29, seat section 30, and cantle section 31. Rails section 28 provides the bottom surface of the saddletree including the rails 32 and 33 which rest on the back of the horse. Also, seat opening 19a and stirrup openings 20a are defined, which correspond to seat opening 19 and stirrup openings 20 of saddletree 10. Seat support area 34 is defined intermediate rails 32 and 33, and joins rails 32 and 33 together along the centerline of rails section 28.

Pommel section 29 generally defines the pommel support shoulders and pommel of the tree, and is joined at and along its lower edge 35 to the forward edge 36 of rails section 28.

Seat section 30 also defines seat opening 19b and stirrup support openings 20b which are alignable with corresponding openings in rails section 28. Seat section 30 joins at and along its forward edge 38 to the upper edge 39 of pommel section 29, and at and along its side edges 40 to the side edges 41 of rails section 28.

Cantle sections 31 conforms to the shapes of the rear portions of rails section 28 and seat section 30, and is joined at and along its upper edge 42 with the rear edge 44 of seat section 30, and at and along its lower edge 45 with the rear edge 46 of rails section 28.

Rails section mold 48 conforms in shape to rails section 28, and is utilized to mold rails section 28. Similarly, pommel section mold 49, seat section mold 50, and cantle section mold 51 are all shaped as their corresponding pommel section 29, seat section 30, and cantle section 31. Rails section mold 48 is supported by frame 52 which includes a longitudinal support member 54 and a laterally extending support member 55. Hinge leaves 56 and 58 are fastened to longitudinal support member 54 at opposite ends of rails section mold 48. Pommel section mold 49 is connected to forward pivotal support member 59. Pommel support block 60 extends beneath the portion of pommel section mold 49 that forms the pommel of pommel section 29, and lower shoulder support rod 61 extends from the lower portions of pommel section mold 49 and around support member 59 to positively position and support pommel section mold 49.

Seat section mold 50 includes laterally extending support member 62 which extends across the seat area of the mold, and longitudinal support member 64 which extends from the pommel area to the cantle area of the mold. Seat section mold 50 corresponds in shape to the seat section 30 of the saddletree.

Cantle section mold 51 includes pivotal support member 65 and support yoke 66. Support yoke 66 is generally U-shaped and the ends of its legs are connected to the tapered portions of cantle mold section 51. The base of yoke 66 is connected by means of support pin 68 to pivotal support member 65. Pivotal support member 65 is connected intermediate its ends to and supports cantle section mold 51.

The pivotal support members 59 and 65 of pommel section mold 49 and cantle section mold 51, respectively, each include hinge leaves 69 and 70 which mate with hinge leaves 56 and 58 of frame 52. Hinge pins 71 and 72 are insertable through hinge leaves 56–69 and 58–70, respectively, to hingedly connect pommel section mold 49 and cantle section mold 51 to frame 52.

Laterally extending support member 55 of frame 52 defines slots 74 which open through the ends of support members 55 and laterally extending support member 62 defines slots 75 which open to its ends. Clamping rods 76 are positionable in slots 74 and 75 when the sectional mold is assembled, to hold seat section mold 50 in place on rails section mold 48. Clamping rods 76 include heads 78 and sleeves 79 which assure the proper spacing of rails section mold 48 from seat section mold 50.

The upper ends of pivotal support members 59 and 65 of pommel section mold 49 and cantle section mold 51 also defines slots 80 and 81 respectively, and clamping rod 82 is positioned in slots 80 and 81 when the section of the mold are assembled. Head 84 and sleeve 85 assure the proper spacing of pommel section mold 49 from cantle section mold 51.

When the saddletree mold of FIG. 3 is to be used to fabricate a saddletree, the sections of the mold are taken apart and positioned so that the interior surfaces of the mold sections are exposed and conveniently arranged. The workman applies sheets or mats of fiber glass to the mold surfaces and saturates the mats with a mixture including polyester resin composition and a catalysis. The polyester resin composition suitable for use in the molding process includes ethylene glycol, maleic anhydride, phthalic anhydride, styrene, degradation inhibitors, thixotropic agent, and cobalt metal. The polyester resin used in the molding process includes Marco MR–480 and MR–455 resins, manufactured by Marco Chemical Division of W. R. Grace and Company. These particular resins are in liquid form and can be cured at room temperature by the addition of 0.25 to 1.0 percent methyl ethyl ketone peroxide. When two plies of one and one-half ounce fiber glass mat have been formed as a laminate and saturated with the resins and cured, the ultimate strength properties are: flexural strength—24,000 to 32,000 pounds per square inch; tensile strength—15,000 to 17,000 pounds per square inch; compressive strength—40,000 to 45,000 pounds per square inch. Several sheets of saturated fibrous glass are applied in layers over the mold surface until the sections of the saddletree are built up to the desired thickness. The mats of fibrous glass will cover substantially the entire mold surfaces. The mats applied to the rails section mold 48 and the seat section mold 50 will be applied in such a manner so as to leave the seat openings and stirrup openings open. The saturated mats are allowed to cure until they are rigid.

After the various sections of the saddletree have been cured, additional layers of saturate fibrous mat are applied to the edges of the molded saddletree sections, and the sectional mold is then assembled. Pommel section mold 49 is connected to frame 52 by inserting hinge piece 69 into hinge piece 56 and sliding hinge pin 71 through the mated hinge pieces. Cantle section mold 51 is connected to frame 52 in a similar manner by means of hinge pieces 58 and 70 and hinge pin 72. Seat section mold is placed on top of rails section section mold 48 so that the lower edges 40 of seat section 30 will mate with the lower edges 41 of rails section 28. Pommel section mold 49 is then pivoted about its hinge connection until pommel section 29 abuts the forward edges 36 and 38 of rails section 28 and seat section 30. Cantle section 51 is also pivoted about its hinge connection until the upper and lower edges 42 and 45 abut rear edges 44 and 46 of seat section 30 and rail section 28, respectively. The mold sections are adjusted as necessary, and clamping rods 76 clamp seat section mold 50 to rails section mold 48, while clamping rod 82 clamps pommel section mold 49 to cantle section mold 51. The sections of the saddletree are positively held together in this manner, and the seat openings and stirrup openings of rails section 28 and seat section 30 will be in alignment with each other, and seat support portion 34 of rail section 28 will abut the inside surface of seat section 30.

After the mold has been assembled, the saddletree is left to cure. After the necessary curing time has elapsed, the mold sections can be disassembled, by merely pulling the various mold sections away from the completed saddletree.

Under normal conditions, it is desirable to have a saddletree constructed with at least some thickness, in a shape somewhat similar to the wooden saddletrees. Since the amount of material required to fabricate the saddletree disclosed herewith is much less than that which would be required to construct a completely solid saddletree, the molded saddletree is formed with hollow portions at its forward and rear portions. The hollow portions of saddletree 10 are filled with filler material (FIG. 2) which includes a mixture of polyester resin as disclosed above and wood chips, such as sawdust or saw cuttings. The wood filler 21 and 22 substantially occupies the hollow portions of the saddletree and provides a mass of material into which anchor means such as nails, screws, etc. can penetrate. During the assembly process, pipe 24 is placed in seat section mold 50, so that its loop 25 extends up into the pommel portion of the mold section, and will be present in the pommel 14 of said saddletree 10 after assembly. The wood filler 21 and 22 can be placed in the sections of the saddletree prior to their assembly, by laying the mixture in the sections of the tree by hand, or the filler can be added to the saddletree after its assembly by injecting it through apertures formed in the saddletree. In either case, pipe 24 will be substantially surrounded by filler 21 in the forward portion of saddletree 10, which helps stabilize pipe 24, and adds strength to the pommel.

When the mold sections are removed from the saddletree, they can be used again immediately for the fabrication of another saddletree. The saddletrees formed by the use of the mold will be virtually identical in size and shape. If it is desired to have the saddletree be a certain color, a dye can be added to the polyester resin mixture before the fibrous glass mats are saturated with the mixture, and the saddletree will assume the color of the dye. If it is desired to form a saddletree of the "cutter" or "roper" styles, or of any number of other saddle styles, the pommel section 49 and seat section 50 of the sectional mold can be replaced with mold sections which create the desired saddletree shape. The cantle section and rails section do not have to be changed. Furthermore, if the length of the saddle is to be changed, shorter or longer rails sections and seat section molds can be provided without changing the cantle section and pommel section of the mold. Thus a mold is provided which utilizes interchangeable mold sections to provide various styled saddletrees.

While the mold sections have been shown as four in number, it should be understood that the mold could be broken into more or fewer sections as may be desired. For instance, the forward portions of rails section mold 48 and seat section mold 50 each could be formed to include portions of pommel section mold 49, and the separate pommel section mold could be eliminated. Futhermore, while a particular resinous mixture, catalysis, and substrate material have been disclosed, it should be understood that various other similar types of materials could be used. And while wood chips have been disclosed as part of the filler material, various other materials can be used, including polystyrene. The filler material adds strength to the structure and serves to anchor the screws, etc., which penetrate the tree.

It will be obvious to those skilled in the art that many variations may be made in the embodiments chosen for the purpose of illustrating the present invention without departing from the scope thereof as defined by the appended claims.

I claim:
1. A saddletree comprising a liquid impervious hollow shell and a filler within the confines of said shell wherein said shell is fabricated of fibrous glass and polyester resin, and said filler including a mixture of wood chips and polyester resin constitutes a means for filling space in the hollow shell and providing anchor receiving means.

2. The invention of claim 1 wherein said shell includes a pair of supporting hollow rail sections, a hollow pommel section, a seat section and a hollow cantle section, and wherein the filler is positioned throughout at least some of said rail sections, pommel section and cantle section.

3. The invention of claim 2 and further including a metal bar extending internally into said pommel from within said shell.

4. The invention of claim 1 wherein said shell is molded as a unitary structure and defines apertures opening into its interior through which said filler is inserted.

5. The invention of claim 1 wherein said shell defines stirrup support openings.

References Cited
UNITED STATES PATENTS

| | | | |
|---|---|---|---|
| 3,153,887 | 10/1964 | Bohlin | 54—37 |
| 3,258,894 | 7/1966 | Hoaglin | 54—44 |
| 3,286,440 | 11/1966 | Walker et al. | 54—44 |
| 3,293,828 | 12/1966 | Hessler | 54—44 |
| 3,323,286 | 6/1967 | Le Laurin | 54—44 |
| 3,371,467 | 3/1968 | Salsbury | 54—44 |

ALDRICH F. MEDBERY, Primary Examiner